United States Patent
Rembert

(10) Patent No.: US 12,154,149 B2
(45) Date of Patent: Nov. 26, 2024

(54) SYSTEM FOR PRESENTING FOOD ALTERNATIVES TO FOOD BUYERS

(71) Applicant: FoodMaven, Inc., Colorado Springs, CO (US)

(72) Inventor: Jason Rembert, Colorado Springs, CO (US)

(73) Assignee: FOODMAVEN, INC., Colorado Springs, CO (US)

(*) Notice: Subject to any disclaimer, the term of this patent is extended or adjusted under 35 U.S.C. 154(b) by 198 days.

(21) Appl. No.: 17/896,418

(22) Filed: Aug. 26, 2022

(65) Prior Publication Data

US 2022/0414727 A1 Dec. 29, 2022

Related U.S. Application Data

(62) Division of application No. 16/549,751, filed on Aug. 23, 2019, now Pat. No. 11,443,355.

(60) Provisional application No. 62/721,972, filed on Aug. 23, 2018.

(51) Int. Cl.
*G06Q 30/00* (2023.01)
*G06Q 30/0601* (2023.01)

(52) U.S. Cl.
CPC ..... *G06Q 30/0601* (2013.01); *G06Q 30/0613* (2013.01); *G06Q 30/0631* (2013.01); *G06Q 30/0633* (2013.01); *G06Q 30/0641* (2013.01)

(58) Field of Classification Search
CPC ........... G06Q 30/0601; G06Q 30/0613; G06Q 30/0631; G06Q 30/0633; G06Q 30/0641
See application file for complete search history.

(56) References Cited

U.S. PATENT DOCUMENTS

| | | | |
|---|---|---|---|
| 7,206,756 B1* | 4/2007 | Walsky | G06Q 30/0633 715/744 |
| 7,899,701 B1 | 3/2011 | Odom | |
| 8,112,317 B1 | 2/2012 | Ballaro et al. | |
| 11,443,355 B2 | 9/2022 | Rembert | |
| 2001/0047293 A1 | 11/2001 | Waller et al. | |
| 2004/0117235 A1 | 6/2004 | Shacham | |
| 2008/0215349 A1 | 9/2008 | Baran et al. | |
| 2010/0211436 A1 | 8/2010 | Checketts et al. | |
| 2011/0066662 A1* | 3/2011 | Davis | G06F 40/258 707/811 |

(Continued)

FOREIGN PATENT DOCUMENTS

| | | | | |
|---|---|---|---|---|
| CA | 2694372 A1 * | 1/2009 | ....... | G06F 17/30781 |
| JP | 3883135 B1 * | 2/2007 | | |
| JP | 2013097765 A * | 5/2013 | | |

OTHER PUBLICATIONS http://web.archive.org/web/20060713181801/www.adaptiveblue.com/features.html (Year: 2006).*

(Continued)

*Primary Examiner* — Matthew E Zimmerman
(74) *Attorney, Agent, or Firm* — Sheridan Ross P.C.

(57) ABSTRACT

Embodiments of the present disclosure relate generally to systems and methods for reducing food loss, and more particularly to electronic exchanges and computer systems enabling the purchase and sale of food products in a secondary market. The computer systems of the invention generally comprise at least a browser extension installed on a user computer and a product data application programming interface (API).

6 Claims, 6 Drawing Sheets

(56) References Cited

U.S. PATENT DOCUMENTS

| | | | |
|---|---|---|---|
| 2012/0253908 A1 | 10/2012 | Ouimet et al. | |
| 2013/0282438 A1 | 10/2013 | Hunter et al. | |
| 2013/0297464 A1* | 11/2013 | Jaquez | G06Q 20/12 705/28 |
| 2014/0122203 A1* | 5/2014 | Johnson | G06Q 30/0633 705/26.8 |
| 2015/0006354 A1 | 1/2015 | Kittelsen | |
| 2016/0217509 A1 | 7/2016 | Eggleston, IV et al. | |
| 2016/0267570 A1 | 9/2016 | Hodges | |
| 2017/0178534 A1 | 6/2017 | Prakash et al. | |
| 2017/0228683 A1 | 8/2017 | Hu et al. | |
| 2018/0165740 A1* | 6/2018 | Jadhav | G06Q 30/0625 |
| 2018/0218414 A1 | 8/2018 | Moghadam et al. | |
| 2020/0160413 A1 | 5/2020 | Rembert | |
| 2020/0234356 A1 | 7/2020 | Rembert | |

OTHER PUBLICATIONS

Li et al., "Regular Expression Learning for Information Extraction," Proceedings of the 2008 Conference on Empirical Methods in Natural Language Processing, Association for Computational Linguistics, Oct. 2008, pp. 21-30.

Wang et al., "A dynamic product quality evaluation based pricing model for perishable food supply chains," Omega, vol. 40, No. 6, Feb. 28, 2012, pp. 906-917.

Official Action for U.S. Appl. No. 16/549,751, dated Jan. 18, 2022, 6 pages. Restriction Requirement.

Notice of Allowance for U.S. Appl. No. 16/549,751, dated May 4, 2022, 15 pages.

Official Action for U.S. Appl. No. 16/685,549, dated May 19, 2021, 42 pages.

Official Action for U.S. Appl. No. 16/685,549, dated Oct. 27, 2021, 54 pages.

Official Action for U.S. Appl. No. 16/685,549, dated Aug. 26, 2022, 60 pages.

Official Action for U.S. Appl. No. 16/746,376, dated Sep. 27, 2021, 8 pages. Restriction Requirement.

Official Action for U.S. Appl. No. 16/746,376, dated Dec. 14, 2021, 18 pages.

Official Action for U.S. Appl. No. 16/746,376, dated Jun. 29, 2022, 19 pages.

Official Action for U.S. Appl. No. 16/685,549, dated Mar. 17, 2023, 66 pages.

Official Action for U.S. Appl. No. 16/685,549, dated Oct. 23, 2023, 13 pages.

Official Action for U.S. Appl. No. 16/685,549, dated Jul. 5, 2024, 16 pages.

* cited by examiner

SYSTEM FOR PRESENTING FOOD ALTERNATIVES TO FOOD BUYERS

CROSS-REFERENCE TO RELATED APPLICATION

This application is a divisional of U.S. patent application Ser. No. 16/549,751, filed 23 Aug. 2019, which claims the benefit of U.S. Provisional Patent Application 62/721,972, filed 23 Aug. 2018, the entirety of which is incorporated herein by reference.

FIELD OF THE INVENTION

Embodiments of the present disclosure relate generally to systems and methods for reducing food loss, and more particularly to electronic exchanges and computer systems enabling the purchase and sale of food products in a secondary market. The computer systems of the invention generally comprise at least a browser extension installed on a user computer and a product data application programming interface (API).

BACKGROUND OF THE INVENTION

Lost food, defined in general terms as food that fails to be used for good purpose, represents an economic loss of at least $200 billion per year in the United States alone. Food loss can have many causes, including but not limited to ordering errors, cancellations of purchases or sales at short notice, cosmetic blemishes, and so on.

Because many food products are perishable, owners of excess or unsold food have very little time to sell or donate this food, and as a result, enormous quantities of food are simply thrown away and sent to landfills. Meanwhile, more than 42 million Americans do not get enough to eat, more than 38 million receive government food purchasing assistance (which they must use to purchase food at full retail prices), and at least 23.5 million live in food deserts where convenience stores may be the only option for purchasing food.

At present, there are few or no effective, reliable, well-known mechanisms in place by which supermarkets, wholesale food distributors, or farmers and ranchers can quickly find potential buyers for excess food. This represents a significant lost opportunity for both consumers and producers of food: consumers desire lower prices on fresh and/or local food products, and producers, who frequently have no other option for disposing of excess food besides simply discarding it, are often willing to sell excess food even at significant discounts.

There is thus a need in the art for systems and methods that quickly and reliably connect producers who have excess food to sell with consumers who wish to buy excess food. It is further advantageous for such systems and methods to provide individuals, restaurants, hospitality companies, caterers, and other institutions (e.g. hospitals, prisons, schools, etc.) with healthier, more diverse, and/or less expensive food purchasing options.

SUMMARY OF THE INVENTION

It is one aspect of the present invention to provide a method for displaying, on a graphical user interface (GUI), market information relating to and facilitating trading of a food product available in a primary market, comprising (a) obtaining product data of the food product, the product data comprising at least one of a name, a description, a stock keeping unit (SKU), the first price, a weight, and a count; (b) obtaining time-and-place data of a user of the graphical user interface, the time-and-place data comprising at least one of a website identifier, a ZIP code, a date, a time, and a user identifier; (c) constructing a data structure comprising the product data and the time-and-place data; (d) storing the data structure in a computer memory; (e) encoding the data structure; (f) parsing the encoded data structure at least to determine an identity of the food product, normalize the first price of the food product, and determine whether an alternative food product is available in a primary or secondary market, wherein the primary or secondary market comprises an electronic exchange; (g) selecting a particular icon based on whether the alternative food product is available; and (h) in response to operation, by a user input device, of a first region in a first location in the graphical user interface corresponding to the food product, setting a plurality of parameters for a purchase order relating to the food product and displaying a second region operable by a user input device in a second location in the graphical user interface corresponding to the food product.

In embodiments, the method may further comprise dynamically displaying the icon in the first location in the graphical user interface corresponding to the food product; upon determining that the alternative food product is available, displaying the first region operable by the user input device in the first location; and in response to operation of the second region by the user input device, communicating the purchase order to a computer of the electronic exchange over a network.

In embodiments, step (f) may comprise implementing instructions contained in a configuration file. The configuration file may, but need not, comprise an HTML Document Object Model (DOM). The configuration file may, but need not, comprise code for implementing a pattern matching algorithm, which code may, but need not, comprise a regular expression.

In embodiments, the user identifier may comprise an email address.

In embodiments, an identity of the alternative food product may be the same as the identity of the food product and the primary or secondary market comprising an electronic exchange is a secondary market, wherein a price of the alternative food product in the secondary market is lower than the price of the food product in the primary market.

It is another aspect of the present invention to provide a server of a system for facilitating trading of a food product, comprising a processor; and a memory coupled with and readable by the processor and storing therein a set of instructions which, when executed by the processor, causes the processor to facilitate trading trading of a food item by (a) obtaining, by a server, product data of the food product, the product data comprising at least one of a name, a description, a stock keeping unit (SKU), the first price, a weight, and a count; (b) obtaining, by the server, time-and-place data of a user of the graphical user interface, the time-and-place data comprising at least one of a website identifier, a ZIP code, a date, a time, and a user identifier; (c) constructing, by the server, a data structure comprising the product data and the time-and-place data; (d) storing, by the server, the data structure in a computer memory; (e) encoding, by the server, the data structure; (f) parsing, by the server, the encoded data structure at least to determine an identity of the food product, normalize the first price of the food product, and determine whether an alternative food product is available in a primary or secondary market, wherein the primary or secondary market comprises an electronic exchange; (g) selecting, by the server, a particular icon based on whether the alternative food product is available; and (h) in response to operation, by a user input device, of a first region in a first location in the graphical user interface corresponding to the food product, setting, by the server, a plurality of parameters for a purchase order relating to the food product and displaying a second region operable by a user input device in a second location in the graphical user interface corresponding to the food product.

In embodiments, the processor may further facilitate trading of the food item by causing a client device to dynamically display the icon in the first location in the graphical user interface corresponding to the food product; upon determining that the alternative food product is available, causing the client device to display the first region operable by the user input device in the first location; and in response to operation of the second region by the user input device, causing the client device to communicate the purchase order to a computer of the electronic exchange over a network.

In embodiments, step (f) may comprise implementing instructions contained in a configuration file. The configuration file may, but need not, comprise an HTML Document Object Model (DOM). The configuration file may, but need not, comprise code for implementing a pattern matching algorithm.

In embodiments, the user identifier may comprise an email address.

It is another aspect of the present invention to provide a system for facilitating electronic trading of a food product, comprising a product data application programming interface (API) or service; a product identification API or service; and a price and weight normalization API or service, wherein the product data API or service receives a data structure comprising food product data and user data from a browser extension running within a web browser, parses the data structure, and communicates parsed food product data and parsed user data to the product identification API or service and the price and weight normalization API or service, wherein the product identification API or service applies a product identification algorithm to the parsed food product data and the parsed user data and communicates food product identifying data to the product data API or service, wherein the price and weight normalization API or service applies a price and weight normalization algorithm to the parsed food product data and the parsed user data and communicates normalized price and weight data to the product data API or service, and wherein the product data API applies a set of logical filtering elements to the food product identifying data and the normalized price and weight data to produce filtered food product trading data and displays an indicator in a graphical user interface of the web browser, the indicator corresponding to the filtered food product trading data.

In embodiments, the browser extension may collect food product data associated with the food product from a website accessed by the web browser, store or further collect user data associated with a user, and construct and encode the data structure. The browser extension may, but need not, construct and encode the data structure by implementing instructions contained in a configuration file. The configuration file may, but need not, comprise an HTML Document Object Model (DOM). The configuration file may, but need not, comprise code for implementing a pattern matching algorithm.

In embodiments, the indicator may be associated with a region operable by a user input device.

Figure 1:
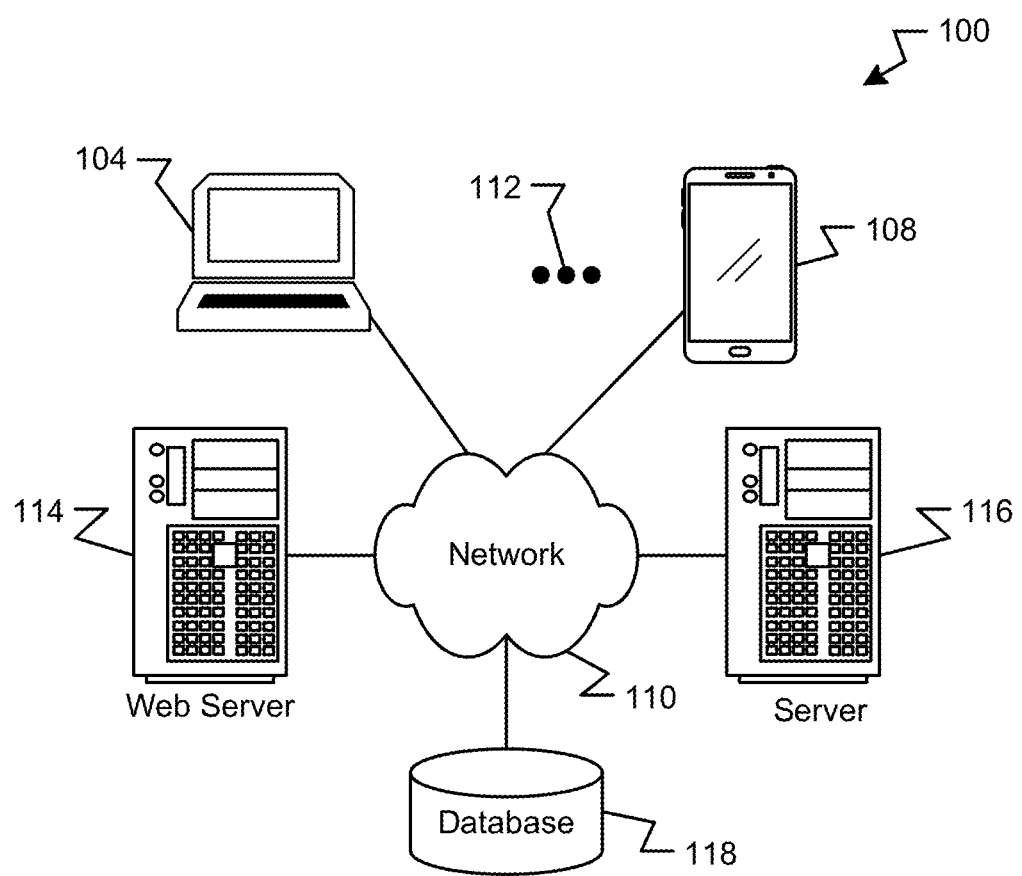
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION OF THE INVENTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

As used herein, the terms "primary market" and "primary food market" are interchangeable and each refer to conventional wholesale or retail markets for the purchase and sale of food products. By way of non-limiting example, farmers, ranchers, grocery stores, and commercial food services are generally sellers in the primary market, and individuals, restaurants, caterers, hospitals, prisons, and schools are generally buyers in the primary market.

As used herein, the term "excess food" refers to any food product that cannot be sold on the primary market, or that has already been sold on the primary market but whose purchaser on the primary market desires to resell.

As used herein, the terms "secondary market" and "secondary food market" are interchangeable and each refer to markets for the purchase and sale of excess food.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. In additional embodiments, the disclosed methods may be implemented in conjunction with functional programming. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

Embodiments of the disclosure provide systems and methods for reducing food loss. Generally speaking, embodiments described herein provide electronic exchanges and computer systems enabling the purchase and sale of food products in a secondary market. The computer systems of the invention generally comprise at least a browser extension installed on a user computer and a product data application programming interface (API). More specifically, preferred embodiments comprise a browser extension, a web browser, a browser extension update service, a product data API, a product identification API, a price and weight normalization API, and a product alternative API, which collectively enable potential buyers and potential sellers of excess food or other alternative food products to locate and take advantage of opportunities for buying/selling excess food via the Internet or another computer network.

Various additional details of embodiments of the present disclosure will be described below with reference to the figures. While the flowchart(s) will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
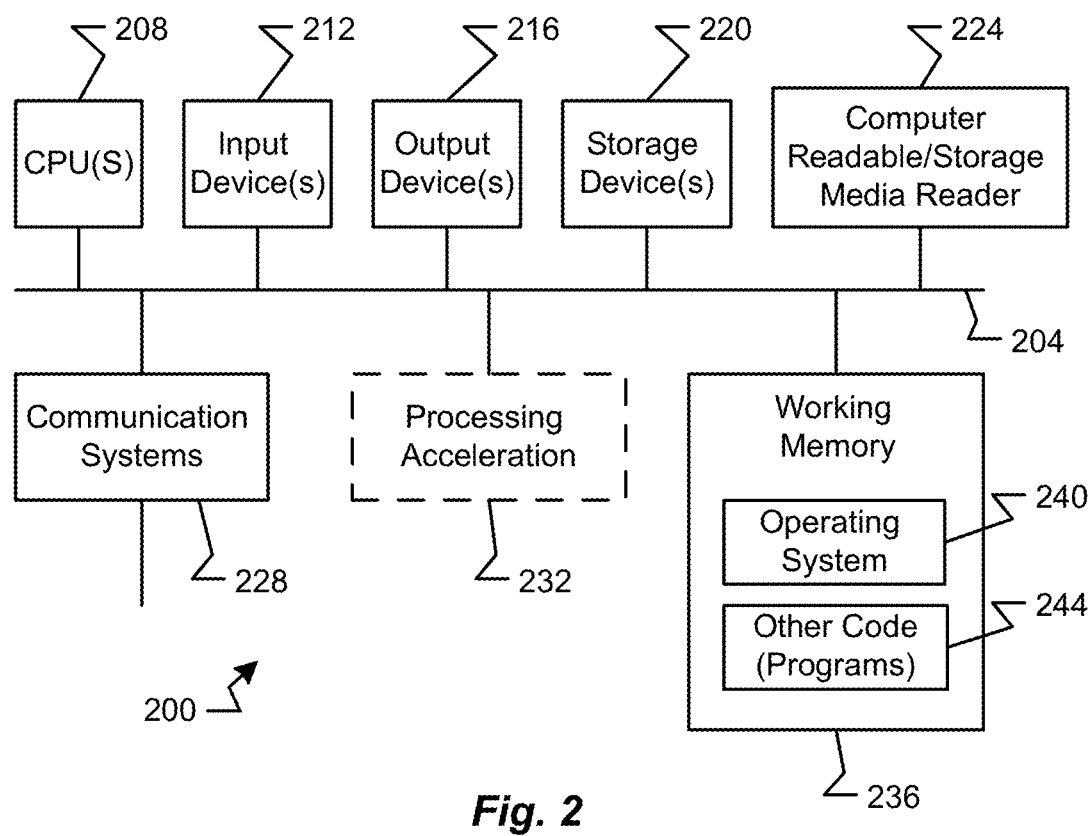
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updatable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
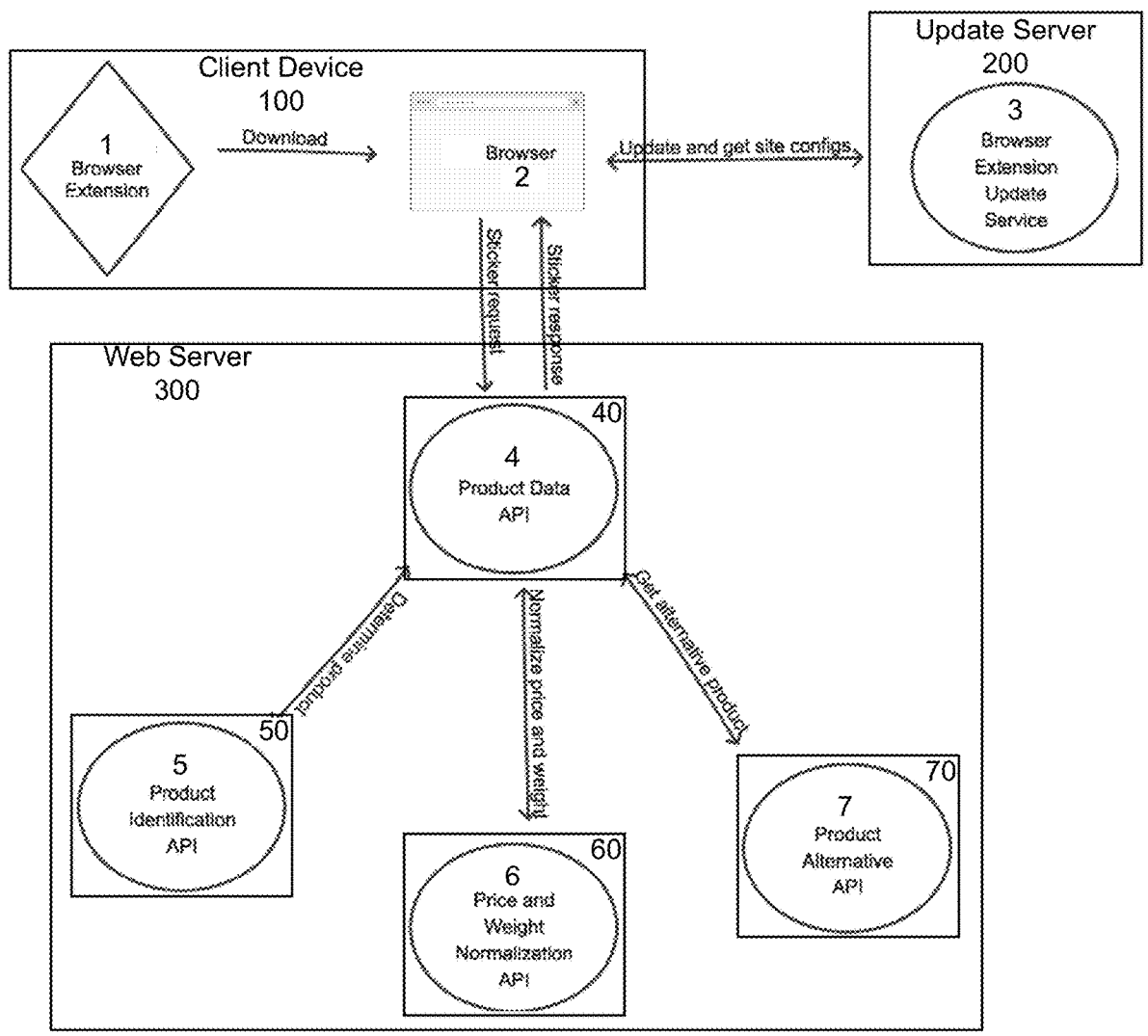
FIG. 3 is a generalized diagram of a system for facilitating purchases and sales of excess food via the Internet, according to embodiments of the present invention.

Referring now to FIG. 3, a computer system for connecting sellers of excess food to buyers of excess food is illustrated. The system comprises a browser extension 1 and a web browser 2 embodied within a client device 100; a browser extension update service 3 embodied within an update server 200; and a product data API 4, a product identification API 5, a price and weight normalization API 6, and a product alternative API 7, each of which is embodied within respective applications 40, 50, 60, 70 that are in turn embodied within a web server 300. In some embodiments, the update server 200 and the web server 300 may, but need not, be the same server.

Potential buyers of excess food or other alternative food products download and install the browser extension 1 from any suitable source, including, by way of non-limiting example, directly through a web browser 2 that provides a browser extension marketplace, or from a website that hosts, markets, and showcases third-party browser extensions. The browser extension 1 may be adapted and/or configured to run in conjunction with any suitable web browser 2, including but not limited to Google Chrome, Internet Explorer, Mozilla Firefox, and Safari.

The browser extension, upon initial download and installation into the web browser 2, generally queries a user for information that may be used to identify the user to any one or more of the browser extension update service 3, the product data API 4, the product identification API 5, the price and weight normalization API 6, and the product alternative API 7. This identifying information may, in various embodiments, include any one or more of an email address, a mailing address or a part thereof (such as a city and state and/or ZIP code), a telephone number, and/or a unique user identifier. The browser extension 1 then stores this identifying information so that the user may be identifiable to the system whenever the user opens the web browser 2. As described in greater detail below, any one or more of the browser extension update service 3, the product data API 4, the product identification API 5, the price and weight normalization API 6, and the product alternative API 7 may use the identifying information to pair the user with the user's preferences, e.g. shopping behavior, favored or disfavored food products, preferred food shopping websites, and so on.

The browser extension 1 and various other components of the system may be configured or adapted to allow a single user to be identified on any of several various devices by the use of the identifying information provided to the browser extension 1. By way of non-limiting example, a single user account, linked with identifying information associated with a specific individual user, may be accessible, simultaneously or otherwise, from a home computer, a work computer, and a mobile device, any of which may run a suitable embodiment of the web browser 2 and thus the browser extension 1 embodied therein. In this way, any user can easily utilize the system from any conveniently accessible device, because his or her identifying information "follows" him or her, thus improving the food buying experience.

Once the browser extension 1 has been installed and the user has provided identifying information to the browser extension 1, a visual indicator corresponding to the browser extension 1 may be provided in a browser extension menu bar or other suitable region of a user interface (UI) window of the web browser 2. The visual indicator allows the user to confirm at any time that the browser extension 1 has been installed, is running correctly within the web browser 2, and is functioning to collect suitable information from websites the user accesses via the web browser 2.

One advantage of the present invention is that the overall system comprising the browser extension 1 is almost entirely inconspicuous to the user when the user is using the web browser 2 to access websites other than food shopping/purchasing websites. In fact, other than the visual indicator corresponding to the browser extension 1, the user will not discern any difference in the appearance or performance of the web browser 2 when accessing websites other than food shopping/purchasing websites; the impact of the browser extension 1 on the speed and performance of the web browser 2 is negligible when accessing these sites. As described in further detail below in conjunction with description of the browser extension update service 3, the browser extension 1 does not attempt to collect data from any websites that may be accessed from the web browser 2, except those identified in specific lists and configuration files provided by the browser extension update service 3. In this way, the user can obtain the benefits of the present invention when he or she is purchasing or shopping for food products online, without negatively impacting his or her experience using the web browser 2 at other times.

The browser extension update service 3 is a web service hosted on a computer remote from the user computer on which the web browser 2 is running. The purpose of the browser extension update service 3 is to periodically update each instance of the browser extension 1 with a revised list of sites from which the browser extension 1 should attempt to collect data (typically, the websites of grocery store chains, commercial food services, etc.), and/or configuration files that instruct the browser extension 1 as to how and when data should be collected from the listed sites. The browser extension 1 is configured to call the browser extension update service 3 at regular or irregular intervals to determine whether updated web site lists and configuration files are available; by way of non-limiting example, the browser extension 1 may be configured to call the browser extension update service daily, or when the user launches a new session of the web browser 2.

The configuration files provided by the browser extension update service 3 to the browser extension 1 may take any of several forms and convey various types of configuration information, but in general the configuration files of the browser extension update 3 will include lists of URLs corresponding to the websites of, e.g., grocery stores and commercial food services, and instructions to the browser extension 1 as to how to parse the information contained in pages served by listed websites when those sites are accessed by the web browser 2. In embodiments, the configuration files may include HTML Document Object Models (DOMs), which are APIs that identify objects in an HTML, JSON, XHTML, or XML document (e.g. a webpage) and allow manipulation of the objects. Thus, for any given grocery store or commercial food service website listed by the browser extension update service 3, a corresponding DOM may provide instructions that allow the browser extension 1 to parse the information provided by a webpage on the website and return data pertaining to one or more food products to the product data API 4 in a standardized form, as described in further detail below. The configuration files may also, as described in further detail below, include files and instructions, including but not limited to the same or additional DOMs, that instruct the browser extension 1 as to how to display objects in the UI of the web browser 2 based on data sent to the browser extension 1 from, inter alia, the product data API 4. It is to be understood that the browser extension update service 3 may be administered by one or more human administrators, and/or the browser extension update service 3 or one or more components thereof may update automatically, e.g. by a combination of web crawling and machine learning or any other suitable method.

Whenever the user accesses a new website via the web browser 2, the browser extension 1 intercepts the URL of the web site from the web browser 2 and checks the URL against the list of URLs most recently provided to the browser extension by the browser extension update 3. As described above, the list of sites provided by the browser extension update 3 will generally contain food buying/shopping websites, e.g. grocery store and commercial food service websites. If the newly accessed URL is not contained in the list provided by the browser extension update service 3, the browser extension 1 may, but need not, add the URL to a locally stored list of "non-food buying" websites.

When the user accesses, via the web browser 2, a webpage served by a food buying/shopping website that is listed by the browser extension update service 3 and for which a suitable configuration file exists, the browser extension 1 is activated and begins collecting data from the webpage according to instructions embodied in the configuration file; these data may, but need not, be stored within a food product data structure or repository of the food buying/shopping website (not illustrated). The browser extension 1 generally parses the webpage, seeking certain pre-defined patterns in the DOM of the webpage, and upon finding such a pattern collects and stores the data presented by the page as part of the pattern.

As described above, the DOM represents the structure of the webpage (where the webpage is an HTML, XHTML, or XML document); thus, for any given food purchasing website, the locations on the page where food product data, e.g. product descriptions and prices, are presented, and the manner in which such data are presented, are generally consistent and can easily be parsed by the browser extension 1 when the browser extension 1 is provided the DOM structure by the browser extension update service 3. By way of non-limiting example, a grocery store website, when serving a page showing the names, descriptions, and prices of various food products, will generally display data pertaining to many products at a time, but the order and presentation of the data will be the same regardless of the product. Thus, the browser extension 1, having access to a DOM structure corresponding to the specific food purchasing web site being accessed by the web browser 2, will be able to obtain, parse, and format data pertaining to many food products at once, regardless of the identity of the food product itself (tomatoes, beef, etc.).

In addition to DOM structures provided by the browser extension update service 3, the browser extension 1 may also store or have access to code for implementing pattern matching algorithms that can be employed to interpret the patterns of data embodied in webpages displayed by the web browser 2 and provide formatted data to the product data API 4. Any suitable pattern matching technology as known and used in the art may be employed, including, in embodiments and by way of non-limiting example, regular expressions, i.e. a sequence of characters that define a search pattern. The regular expression may be written in any suitable syntax, including but not limited to POSIX, JavaScript, or Perl.

The browser extension 1 will collect, parse, and format any data pertaining to a particular food product displayed on a food purchasing webpage that will allow any one or more of the product data API 4, the product identification API 5, the price and weight normalization API 6, and the product alternative API 7 to identify the food product, normalize the price and/or weight of the food product, and/or find and provide alternatives to the food product on the secondary market. These data may include, but are not limited to, any one or more of a name, a description, a stock keeping unit (SKU), a price, a weight, and a count.

Upon identifying, collecting, and parsing data pertaining to a particular food product, the browser extension 1 automatically generates a URL or portion thereof that concatenates, encodes, and/or formats the food product data. By way of non-limiting example, where the browser extension 1 identifies a product name as "heirloom tomatoes," a product description as "organic heirloom tomatoes grown in California," a product SKU as 39348927, a product price as $3.47, a product weight as five pounds, and a product count as one (i.e. a food product for sale on a web site interpreted by the browser extension 1 is a single five-pound package of California-grown heirloom tomatoes for $3.47), the browser extension 1 may generate a URL or partial URL comprising the string:

"pn=Heirloom+Tomatoes&pd=Organic+Heirloom+Tomatoes+grown+in+California&ps=39348927& pp=3.47&pw=5lbs&pc=1"

(or a similar string). As described above and throughout this disclosure, the browser extension 1 references a configuration file, provided by the browser extension update service 3, specific to the website offering the food product for sale, to determine how to identify, collect, and parse food product data for each food product displayed on a webpage served by the website.

In addition to data pertaining to food products offered for sale on a food purchasing website, the browser extension 1 may also collect or store information pertaining to the user and/or the food shopping/purchasing instance, which may assist any one or more of the product data API 4, the product identification API 5, the price and weight normalization API 6, and the product alternative API 7 in returning practically useful data to the user of the web browser 2. By way of non-limiting example, the browser extension 1 may collect any one or more of the URL of the website accessed by the web browser 2, location data (e.g. latitude and longitude, street address, and/or ZIP code) pertaining to the physical location of the computer running the web browser 2, a date, a time, and the identifying information relating to the user. The browser extension 1 may store or have access to code for implementing pattern matching algorithms that can be employed to interpret the patterns of data embodied in webpages displayed by the web browser 2 and provide formatted data to the product data API 4. Any suitable pattern matching technology as known and used in the art may be employed, including, in embodiments and by way of non-limiting example, regular expressions, i.e. a sequence of characters that define a search pattern. The regular expression may be written in any suitable syntax, including but not limited to POSIX, JavaScript, or Perl.

Upon identifying, collecting, and parsing data pertaining to a particular user and/or food shopping/purchasing instance, the browser extension 1 automatically generates a URL or portion thereof that concatenates, encodes, and/or formats the user and/or food shopping/purchasing instance data. By way of non-limiting example, where the browser extension 1 identifies a website as kingsoopers.com, a location as ZIP code 80202, a date as 31 Jul. 2018, a time as 15:32 Mountain Daylight Time, and an email address of the user as tyler@gmail.com (i.e. a user with email address tyler@gmail.com visits the food purchasing website kingsoopers.com on a computer located in ZIP code 80202 at 15:32 MDT on 31 Jul. 2018), the browser extension 1 may generate a URL or partial URL comprising the string:

"site=KingSoopers&zip=80202&date=20180731&time= 2132&email=tyler@gmail com"

(or a similar string). As described above and throughout this disclosure, the browser extension 1 references a configuration file, provided by the browser extension update service 3, specific to the website offering the food product for sale, to determine how to identify, collect, and parse user and/or food shopping/purchasing instance data for each food product displayed on a webpage served by the website.

After generating a URL string in which the food product data is encoded or formatted and a URL string in which user and/or food purchasing/shopping instance data is encoded or formatted, the browser extension 1 constructs a URL incorporating one or both of those strings, which is then incorporated into a call to the product data API 4. Generally, the call to the product data API 4 takes the form of, or comprises, a script and/or image request. The browser extension 1 may construct the URL by a simple concatenation of the two URL strings, or it may encode or format the data contained in the URL strings a second time by any known encoding or formatting algorithm. Regardless of the algorithm by which the browser extension 1 encodes or formats the food product data and/or the user and/or food purchasing/shopping instance data in the URL, the browser extension 1 constructs a URL encoding or formatting the data for each and every food product identified on the page displayed by the web browser 2, and thus separately calls, i.e. sends a separate script or image request, the product data API 4 with respect to each and every food product. By way of non-limiting example, where the call to the product data API 4 is formatted as an image request, the call may take the form:

<imgsrc="http://foodmaven.com/api/fmbe/
pd?pn=Heirloom+Tomatoes&pd=Organic+Heirloom+
Tomatoes+grown+in+California&ps=39348927&
pp=3.47&pw=5lbs&pc=1&site=KingSoopers&zip=
80202&date=20180731&time=2132&email=tyler@
gmail com">

By way of further non-limiting example, where the call to the product data API 4 is formatted as a script request, the call may take the form:

<scriptsrc="http://foodmaven.com/api/fmbe/
pd?pn=Heirloom+Tomatoes&pd=Organic+Heirloom+
Tomatoes+grown+in+California&ps=39348927&
pp=3.47&pw=5lbs&pc=1&site=KingSoopers&zip=
80202&date=20180731&time=2132&email=tyler@
gmail com"></script>

The DOM for each food purchasing/shopping website listed by the browser extension update service 3, in addition to providing a method by which the browser extension 1 collects and parses data from a website, also provides a method by which the browser extension 1 places the results of calls to the product API 4, which in embodiments are icons and/or links, in specific locations in the UI of the web browser 2. The browser extension 1 may also store or have access to code for implementing pattern matching algorithms that can be employed to interpret the patterns of data embodied in the results of calls to the product API 4 and display the results in specific locations in the UI of the web browser 2. Any suitable pattern matching technology as known and used in the art may be employed, including, in embodiments and by way of non-limiting example, regular expressions, i.e. a sequence of characters that define a search pattern. The regular expression may be written in any suitable syntax, including but not limited to POSIX, JavaScript, or Perl.

Figure 4:
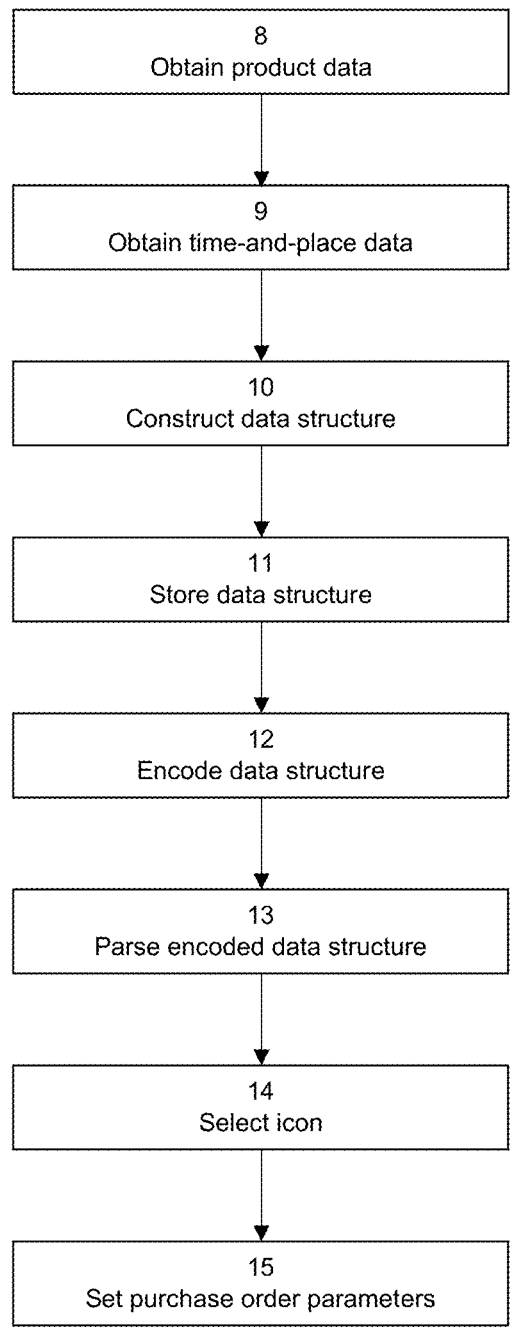
FIG. 4 is a flowchart of a method for parsing calls to a product data application programming interface (API), according to embodiments of the present invention.

Referring now to FIG. 4, the interactions between the client device 100, the update server 200, and the web server 300 are illustrated in more detail. Specifically, these interactions form a method comprising at least a first step 8, a second step 9, a third step 10, a fourth step 11, a fifth step 12, a sixth step 13, a seventh step 14, and an eighth step 15.

In the first step 8, product data pertaining to the food product are obtained. The browser extension 1 will collect, parse, and format any data pertaining to a particular food product displayed on a food purchasing webpage that will allow any one or more of the product data API 4, the product identification API 5, the price and weight normalization API 6, and the product alternative API 7 to identify the food product, normalize the price and/or weight of the food product, and/or find and provide alternatives to the food product on the secondary market. These data may include, but are not limited to, any one or more of a name, a description, a stock keeping unit (SKU), a price, a weight, and a count.

In the second step 9, time-and-place data are obtained. In addition to data pertaining to food products offered for sale on a food purchasing website, the browser extension 1 may also collect or store information pertaining to the user and/or the food shopping/purchasing instance, which may assist any one or more of the product data API 4, the product identification API 5, the price and weight normalization API 6, and the product alternative API 7 in returning practically useful data to the user of the web browser 2. By way of non-limiting example, the browser extension 1 may collect any one or more of the URL of the website accessed by the web browser 2, location data (e.g. latitude and longitude, street address, and/or ZIP code) pertaining to the physical location of the computer running the web browser 2, a date, a time, and the identifying information relating to the user.

In third and fourth steps 10, 11, a data structure is constructed and stored in a computer memory. The data structure comprises the product data and the time-and-place data and is constructed and stored by any suitable method, including but not limited to the methods described throughout this disclosure.

In the fifth step 12, the data structure is constructed. The browser extension 1 generates a URL string in which the food product data is encoded or formatted and a URL string in which user and/or food purchasing/shopping instance data is encoded or formatted, and then constructs a URL incorporating one or both of those strings, which is then incorporated into a call to the product data API 4. Generally, the call to the product data API 4 takes the form of, or comprises, a script and/or image request. The browser extension 1 may construct the URL by a simple concatenation of the two URL strings, or it may encode or format the data contained in the URL strings a second time by any known encoding or formatting algorithm. Regardless of the algorithm by which the browser extension 1 encodes or formats the food product data and/or the user and/or food purchasing/shopping instance data in the URL, the browser extension 1 constructs a URL encoding or formatting the data for each and every food product identified on the page displayed by the web browser 2, and thus separately calls, i.e. sends a separate script or image request, the product data API 4 with respect to each and every food product. By way of non-limiting example, where the call to the product data API 4 is formatted as an image request, the call may take the form:

<imgsrc="http://foodmaven.com/api/fmbe/
pd?pn=Heirloom+Tomatoes&pd=Organic+Heirloom+
Tomatoes+grown+in+California&ps=39348927&
pp=3.47&pw=5lbs&pc=1&site=KingSoopers&zip=
80202&date=20180731&time=2132&email=tyler@
gmail com">

By way of further non-limiting example, where the call to the product data API 4 is formatted as a script request, the call may take the form:

<scriptsrc="http://foodmaven.com/api/fmbe/
pd?pn=Heirloom+Tomatoes&pd=Organic+Heirloom+
Tomatoes+grown+in+California&ps=39348927&
pp=3.47&pw=5lbs&pc=1&site=KingSoopers&zip=
80202&date=20180731&time=2132&email=tyler@
gmail com"></script>

In the sixth step 13, the encoded data structure is parsed. This sixth step 13 may comprise several sub-steps as described in greater detail below.

In a first stub-step of the sixth step 13, the identity of the food product is determined. Upon receiving a call from the browser extension 1 containing a URL, the product data API 4 parses those portions of the URL that contain at least one of a product name and a product description, which in the exemplary URL described above are identified by the variable names "pn" and "pd," respectively. The product data API 4 then passes the parsed product name and/or product description data to the product identification API 5, which evaluates the parsed product name and/or product description data and returns a normalized product name to the product data API 4; this evaluation may be accomplished by any one or more suitable means, including but not limited to lookup tables and machine learning. In the exemplary call to the product data API 4 described above, the result returned by the product identification API 5 to the product data API 4, i.e. the normalized name of the food product, might be "heirloom tomato."

In a second sub-step of the sixth step 13, the normalized price of the food product is determined. Upon receiving a call from the browser extension 1 containing a URL, the product data API 4 parses those portions of the URL that contain at least one of a product price, a product weight, and a product count, which in the exemplary URL described above are identified by the variable names "pp," "pw," and "pc," respectively. The product data API 4 then passes the parsed product price, product weight, and/or product count data to the price and weight normalization API 6, which evaluates the parsed product price, product weight, and/or product count data and returns a normalized product price to the product data API 4; this evaluation may be accomplished by any one or more suitable means, including but not limited to arithmetic calculation, lookup tables, and machine learning. In the exemplary call to the product data API 4 described above, the result returned by the price and weight normalization API 6 to the product data API 4, i.e. the normalized price of the food product, might be 4.3 cents per ounce.

It is to be expressly understood that the first and second sub-steps may be performed simultaneously or sequentially in any order.

In a third sub-step of the sixth step 13, the existence and identity of alternatives to the food product on the secondary market are determined. After receiving a call from the browser extension 1 containing a URL, the product data API 4 parses those portions of the URL that contain data pertaining to the user and/or the food purchasing/shopping instance; by way of non-limiting example, in the exemplary URL described above, these data include a website identifier (variable "site"), a ZIP code (variable "zip"), a date (variable "date"), a time (variable "time"), and an email address (variable "email"). Then, after receiving the normalized name of the food product from the product identification API 5 and the normalized price of the food product from the price and weight normalization API 6, the product data API 4 passes the normalized name of the food product, the normalized price of the food product, and the parsed user and/or food purchasing/shopping instance data to the product alternative API 7, which evaluates the normalized name, the normalized price, and the parsed user and/or food purchasing/shopping instance data and returns a URL where the user may view and/or purchase an alternative food product via the web browser 2, or an output indicating that no such alternative food product is available, to the product data API 4; this evaluation may be accomplished by any one or more suitable means, including but not limited to lookup tables and machine learning.

In the seventh step 14, the product data API 4 returns a response to the web browser 2. Upon receiving the URL where the user may view and/or purchase an alternative food product via the web browser 2, or the output indicating that no such alternative food product is available, from the product alternative API 7, the product data API 4 generates an appropriate image redirect response and/or a script response, which will render the requested image, wrap the image with the URL where the user may view and/or purchase the alternative food product (if such a URL is returned by the product alternative API 7), and display the image in a suitable location in the UI of the web browser 2. In this way, if an alternative food product is available, the user may be enabled to navigate to the URL where the user may view and/or purchase the alternative food product, simply by clicking or otherwise activating the requested image in the web browser 2.

In preferred embodiments, the product data API 4 implements an algorithm that returns a different image to the web browser 2 depending on the outputs returned by the product identification API 5, the price and weight normalization API 6, and/or the product alternative API 7. As a first non-limiting example, if the product alternative API 7 returns an output indicating that no alternative food product is available, the product data API 4 may render a single blank, transparent, or white pixel with no wrapped URL, thereby indicating to the user of the web browser that no alternative food product is available. As a second non-limiting example, if the product alternative API 7 identifies an alternative food product that comprises excess food, the product data API 4 may render a "lost food" or "excess food" image wrapped with the appropriate URL, thereby indicating to the user that an alternative food product comprising excess food may be purchased by clicking on the image. As a third non-limiting example, if the product alternative API 7 identifies an alternative food product that is healthier than the food product identified by the product identification API 5, the product data API 4 may render a "healthier food" image wrapped with the appropriate URL, thereby indicating to the user that a healthier alternative food product may be purchased by clicking on the image. As a fourth non-limiting example, if the product alternative API 7 identifies an alternative food product whose source is geographically closer to the user's location than the source of the food product identified by the product identification API 5, the product data API 4 may render a "local food" image wrapped with the appropriate URL, thereby indicating to the user that a more local alternative food product may be purchased by clicking on the image. As a fifth non-limiting example, if the price and weight normalization API 6 returns a normalized price that is higher than a predetermined upper bound for the food product identified by the product identification API 5, the product data API 4 may render a "too expensive" image, thereby indicating to the user that the food product being viewed is more expensive than is typical for comparable food products in the user's area. As a sixth non-limiting example, if the price and weight normalization API 6 returns a normalized price that is lower than a predetermined lower bound for the food product identified by the product identification API 5, the product data API 4 may render a "great deal" image, thereby indicating to the user that the food product being viewed is less expensive than is typical for comparable food products in the user's area.

In the eighth step 15, parameters for a purchase order are set by a server in response to the user clicking or otherwise activating the requested image in the web browser 2, and another region operably by a user input device is displayed in the graphical user interface of the web browser 2. This enables the user to submit the purchase order and cause the purchase order to be communicated to a computer of an electronic exchange over a network.

Figure 5A:
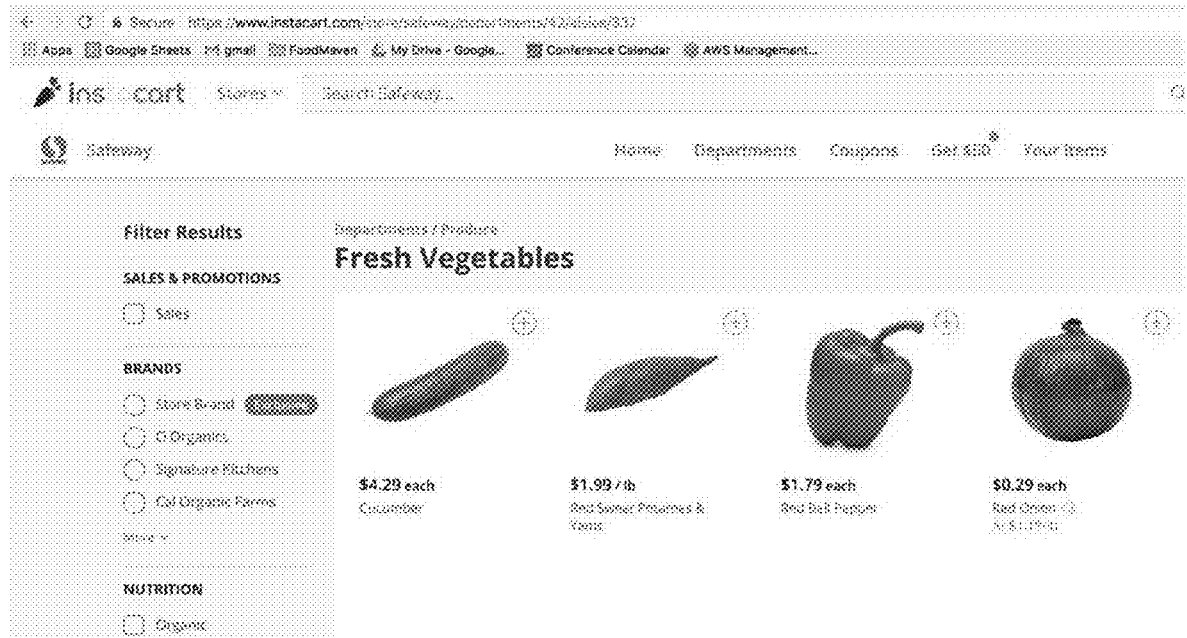
FIGS. 5A and 5B are exemplary images of a grocery shopping website, with and without, respectively, icons or "stickers" displayed by a browser extension of the invention.

Referring now to FIG. 5A, an exemplary UI of a web browser 2 accessing a food purchasing/shopping website, in this example Instacart, is illustrated, when a browser extension 1 of the present invention is not installed and/or active. In this example, the user is viewing four food products (cucumbers, red sweet potatoes/yams, red bell peppers, red onions), each of which has an associated price ($4.29, $1.99, $1.79, and $0.29, respectively) and an associated count or weight (one, one pound, one, and one, respectively).

Figure 5B:
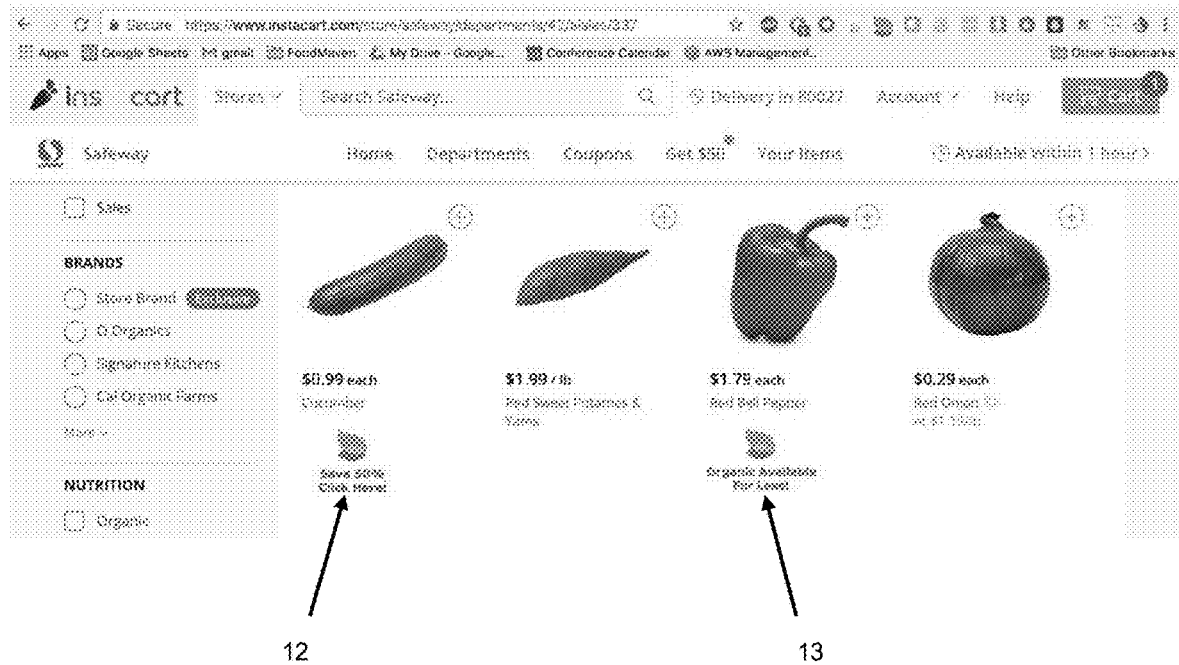

Referring now to FIG. 5B, an exemplary UI of a web browser 2 accessing a food purchasing/shopping website, in this example Instacart, is illustrated, when a browser extension 1 of the present invention is installed and active. This example appears to the user to be similar to the example illustrated in FIG. 5A, except that the product data API 4 of the present invention has placed clickable images, or "stickers," in association with two of the four food products being viewed. Specifically, the product data API 4 has placed a "lost food" or "excess food" sticker 12 in association with cucumbers (indicating to the user that excess cucumbers may be purchased on the secondary market) and a "healthier food" sticker 13 in association with red bell peppers (indicating to the user that a healthier alternative to the red bell peppers being viewed, in this case organic red bell peppers, are available on the secondary market). The user may click on any one or more of the stickers 12, 13 placed in the UI of the web browser 2 by the product data API 4, which will activate links enabling the user to purchase an alternative food product in the secondary market via an electronic exchange, typically an e-commerce website.

Figure 6:
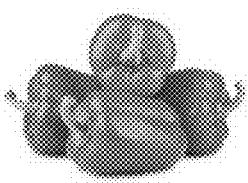
FIG. 6 is an exemplary image of an electronic food product exchange website that enables trading of food products on a secondary market, according to embodiments of the present invention.

Referring now to FIG. 6, an exemplary UI of a web browser 2 accessing an electronic exchange of a secondary food market is illustrated. In this example, the user has clicked on or otherwise activated the image 13 associated with red bell peppers illustrated in FIG. 5B, and as a result the web browser 2 has been directed to the electronic exchange of the secondary food market. The user now has the option of completing a purchase of the alternative food product.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A system for facilitating electronic trading of a food product, comprising:
    a product data application programming interface (API) or service;
    a product identification API or service; and
    a price and weight normalization API or service,
        wherein the product data API or service receives a data structure comprising food product data and user data from a browser extension running within a web browser, parses the data structure, and communicates parsed food product data and parsed user data to the product identification API or service and the price and weight normalization API or service, wherein the product identification API or service applies a product identification algorithm to the parsed food product data and the parsed user data and communicates food product identifying data to the product data API or service, wherein the price and weight normalization API or service applies a price and weight normalization algorithm to the parsed food product data and the parsed user data and communicates normalized price and weight data to the product data API or service, and wherein the product data API applies a set of logical filtering elements to the food product identifying data and the normalized price and weight data to produce filtered food product trading data and displays an indicator in a graphical user interface of the web browser, the indicator corresponding to the filtered food product trading data.

2. The system of claim 1, wherein the browser extension collects food product data associated with the food product from a website accessed by the web browser, stores or further collects user data associated with a user, and constructs and encodes the data structure.

3. The system of claim 2, wherein the browser extension constructs and encodes the data structure by implementing instructions contained in a configuration file.

4. The system of claim 3, wherein the configuration file comprises an HTML Document Object Model (DOM).

5. The system of claim 3, wherein the configuration file comprises code for implementing a pattern matching algorithm.

6. The system of claim 1, wherein the indicator is associated with a region operable by a user input device.

* * * * *